(12) United States Patent
Chiang et al.

(10) Patent No.: US 11,539,940 B2
(45) Date of Patent: Dec. 27, 2022

(54) METHOD AND APPARATUS OF MULTI-HYPOTHESIS IN VIDEO CODING

(71) Applicant: MEDIATEK INC., Hsinchu (TW)

(72) Inventors: Man-Shu Chiang, Hsinchu (TW);
Chih-Wei Hsu, Hsinchu (TW);
Tzu-Der Chuang, Hsinchu (TW);
Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/292,184

(22) PCT Filed: Nov. 12, 2019

(86) PCT No.: PCT/CN2019/117561
§ 371 (c)(1),
(2) Date: May 7, 2021

(87) PCT Pub. No.: WO2020/098653
PCT Pub. Date: May 22, 2020

(65) Prior Publication Data
US 2021/0392322 A1 Dec. 16, 2021

Related U.S. Application Data

(60) Provisional application No. 62/758,761, filed on Nov. 12, 2018.

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/172* (2014.11); *H04N 19/176* (2014.11); *H04N 19/51* (2014.11)

(58) Field of Classification Search
CPC ........................ H04N 19/174; H04N 19/117
See application file for complete search history.

(56) References Cited

U.S. PATENT DOCUMENTS

| 2013/0266070 A1* | 10/2013 | Sato | H04N 19/52 |
| | | | 375/240.16 |
| 2014/0301470 A1 | 10/2014 | Yie et al. | |

(Continued)

FOREIGN PATENT DOCUMENTS

| CN | 103004198 A | 3/2013 |
| CN | 104769947 A | 7/2015 |

(Continued)

OTHER PUBLICATIONS

International Search Report dated Feb. 3, 2020, issued in application No. PCT/CN2019/117561.

(Continued)

*Primary Examiner* — Jerry T Jean Baptiste
(74) *Attorney, Agent, or Firm* — McClure, Qualey & Rodack, LLP (57) ABSTRACT

A method and apparatus of prediction for video coding using MH (Multiple Hypothesis) mode are disclosed. According to this method, a block is partitioned into a first partition and a second partition. A first candidate and a second candidate are derived for the first and second partitions respectively. At least one of the first candidate and the second candidate is derived using a candidate list derived for a regular Merge mode (or also called as normal Merge mode). An MH prediction generated by blending a first prediction corresponding to a first candidate and a second prediction corresponding to a second candidate, and the MH prediction is applied to a part of the current block.

17 Claims, 8 Drawing Sheets

(51) Int. Cl.
    *H04N 19/172* (2014.01)
    *H04N 19/176* (2014.01)
    *H04N 19/51* (2014.01)

(56) References Cited

U.S. PATENT DOCUMENTS

| | | |
|---|---|---|
| 2016/0142729 A1 | 5/2016 | Wang et al. |
| 2017/0105021 A1 | 4/2017 | Lim et al. |
| 2018/0199054 A1 | 7/2018 | Hsu |
| 2022/0046267 A1* | 2/2022 | Zhang .................. H04N 19/537 |

FOREIGN PATENT DOCUMENTS

| | | |
|---|---|---|
| WO | 2011/127963 A1 | 10/2011 |
| WO | 2015/010319 A1 | 1/2015 |
| WO | 2017/197146 A1 | 11/2017 |

OTHER PUBLICATIONS

Chinese language office action dated Feb. 8, 2021, issued in application No. TW 108140997.

Chinese language office action dated Apr. 28, 2022, issued in application No. CN 201980073324.9.

Liao, R., et al.; "CE10.3.1.b: Triangular prediction unit mode;" Joint Video Exploration Team (JVET) of ITU-T SG 16 WP 3 and ISO/IEC JTC 1/SC 29/WG 11; Oct. 2018; pp. 1-8.

Chiang, M., et al.; "CE10.1: Combined and multi-hypothesis prediction;" Joint Video Experts Team (JVET) of ITU-T SG 16 WP 3 and ISO/IEC JTC 1/SC 29/WG 11; Jul. 2018; pp. 1-6.

Extended European Search Report dated 2022-07-26, issued in application No. EP 19884822.8.

Shen, Y., et al.; "MB Mode with joint application of template and block motion compensations;" Joint Collaborative Team on Video Coding (JCT-VC) of ITU-T SG16 WP3 and ISO/IEC JTC1/SC29/WG11; Mar. 2012; pp. 1-7.

Liao, R., et al.; "CE10 related: Combining multi-hypothesis prediction with triangular prediction unit mode;" Joint Video Exploration Team (JVET) of ITU-T SG 16 WP 3 and ISO/IEC JTC 1/SC 29/WG 11; Jul. 2018; pp. 1-4.

Hsu, C., et al.; "Description of Core Experiment 10 (CE10): Combined and multi-hypothesis prediction;" Joint Video Experts Team (JVET) of ITU-T SG 16 WP 3 and ISO/IEC JTC 1/SC 29/WG 11; May 2018; pp. 1-11.

\* cited by examiner

METHOD AND APPARATUS OF MULTI-HYPOTHESIS IN VIDEO CODING

CROSS REFERENCE TO RELATED PATENT APPLICATION(S)

The present invention claims priority to U.S. Provisional Patent Application Ser. No. 62/758,761, filed on Nov. 12, 2018. The U.S. Provisional Patent Application is hereby incorporated by reference in its entirety.

TECHNICAL FIELD

The present invention relates to prediction for video coding using Multi-hypothesis (MH) by combining a first predictor based on a first hypothesis and a second predictor based on a second hypothesis. In particular, the present invention discloses a simplified MH mode by deriving at least one of the MH candidate to generate the first hypothesis of predictor and candidate to generate the second hypothesis of predictor based on the regular Merge mode.

BACKGROUND

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighbouring blocks (spatial candidates) or a temporal block (temporal candidate) located in a co-located picture. The co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

Figure 1:
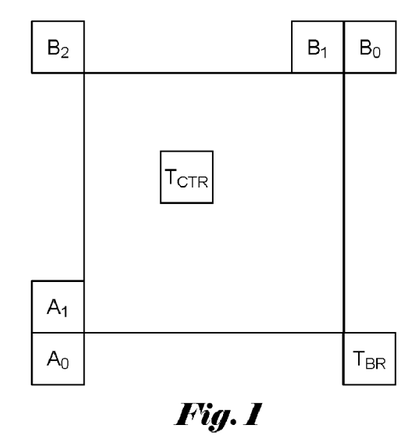
FIG. 1 shows the neighbouring PUs used to derive the spatial and temporal MVPs for both AMVP and Merge scheme.

FIG. 1 shows the neighbouring PUs used to derive the spatial and temporal MVPs for both AMVP and Merge scheme. In AMVP, the left MVP is the first available one from $A_0, A_1$, the top MVP is the first available one from $B_0, B_1, B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0, B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 1, up to four spatial Merge index are derived from $A_0, A_1, B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates. The additional candidates are divided into three candidate types:

1. Combined bi-predictive Merge candidate (candidate type 1)
2. Scaled bi-predictive Merge candidate (candidate type 2)
3. Zero vector Merge/AMVP candidate (candidate type 3)

Figure 2:
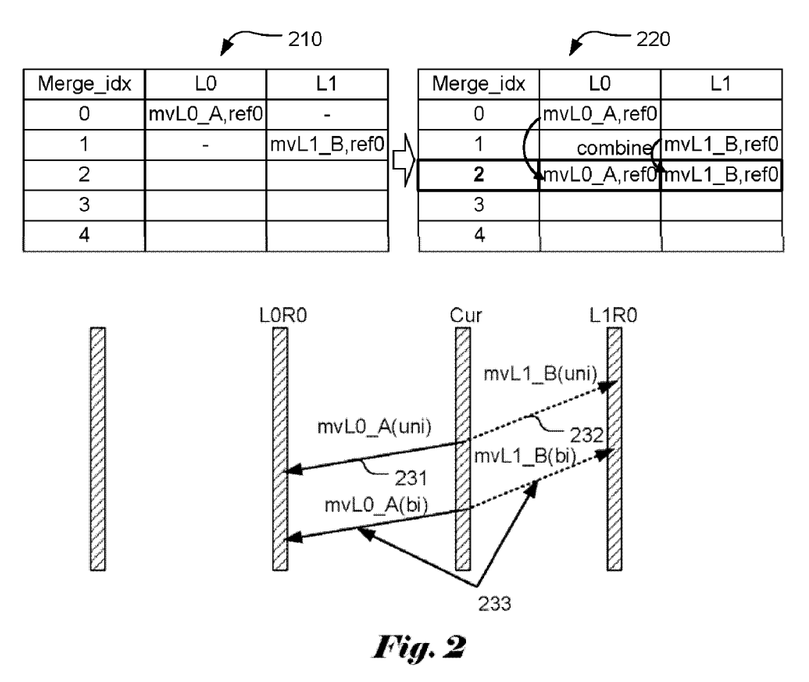
FIG. 2 illustrates an example of the derivation process for combined bi-predictive Merge candidate.

In candidate type 1, combined bi-predictive Merge candidates are created by combining original Merge candidate. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 2 illustrates an example of the derivation process for combined bi-predictive Merge candidate. The candidate set 210 corresponds to an original candidate list, which includes mvL0_A, ref0 (231) in L0 and mvL1_B, ref (232) in L1. A bi-prediction MVP 233 can be formed by combining the candidates in L0 and L1.

Figure 3:
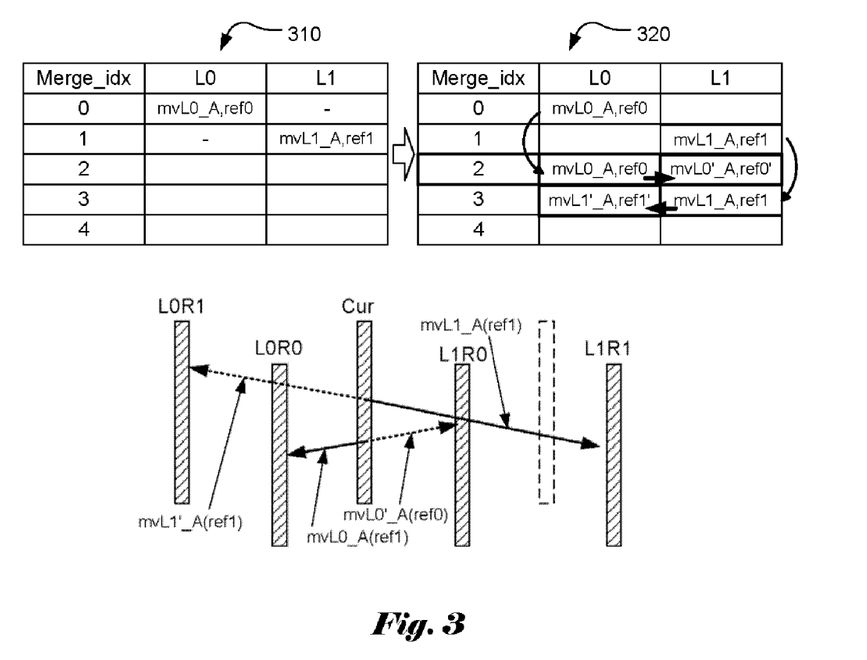
FIG. 3 illustrates an example of the derivation process of the scaled bi-predictive Merge candidate, where candidate list on the left corresponds to an original candidate list and the candidate list on the right corresponds to the expanded candidate list including two generated bi-prediction MVPs.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0'_A is calculated by scaling mvL0_A with ref0 and ref0'. Then, bi-predictive Merge candidate which has mvL0_A and ref0 in list 0 and mvL0' A and ref0' in list 1, is created and added into Merge candidate list. An example of the derivation process of the scaled bi-predictive Merge candidate is shown in FIG. 3, where candidate list 310 corresponds to an original candidate list and candidate list 320 corresponds to the expanded candidate list including two generated bi-prediction MVPs.

Figure 4A:
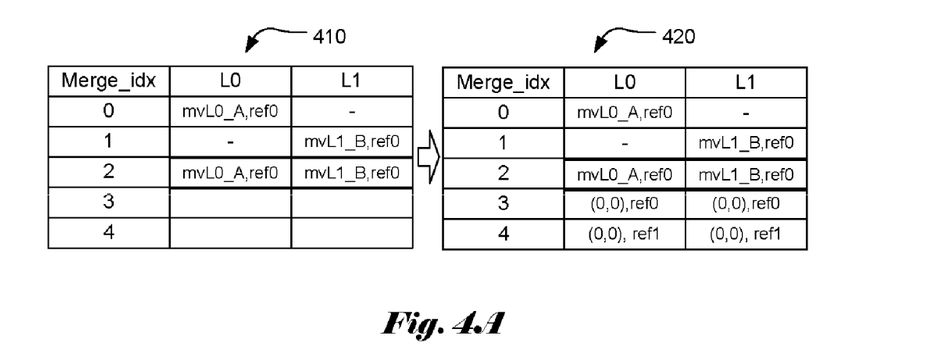
FIG. 4A illustrates an example of adding zero vector Merge candidates, where the candidate list on the left corresponds to an original Merge candidate list and the candidate list on the right corresponds to the extended Merge candidate list by adding zero candidates.
Figure 4B:
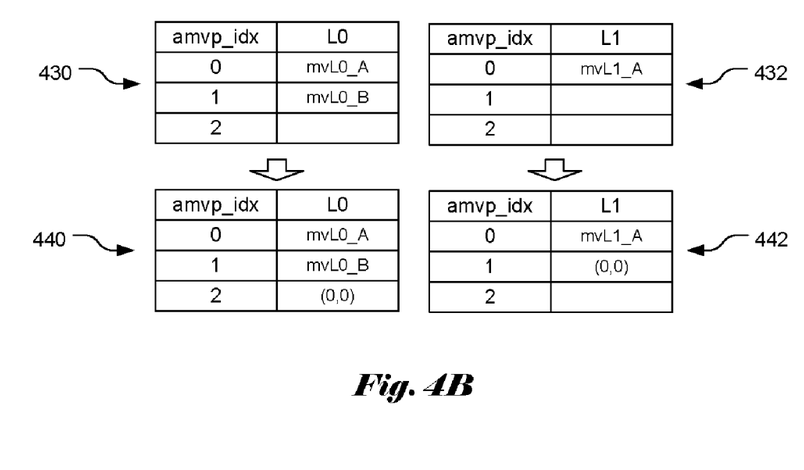
FIG. 4B illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.

In candidate type 3, Zero vector Merge/AMVP candidates are created by combining zero vectors and reference index, which can be referred. FIG. 4A illustrates an example for adding zero vector Merge candidates, where candidate list 410 corresponds to an original Merge candidate list and candidate list 420 corresponds to the extended Merge candidate list by adding zero candidates. FIG. 4B illustrates an example for adding zero vector AMVP candidates, where candidate lists 430 (L0) and 432 (L1) correspond to original AMVP candidate lists and the candidate list 440 (L0) and 442 (L1) correspond to the extended AMVP candidate lists by adding zero candidates. If zero vector candidates are not duplicated, it is added to Merge/AMVP candidates list.

Figure 5:
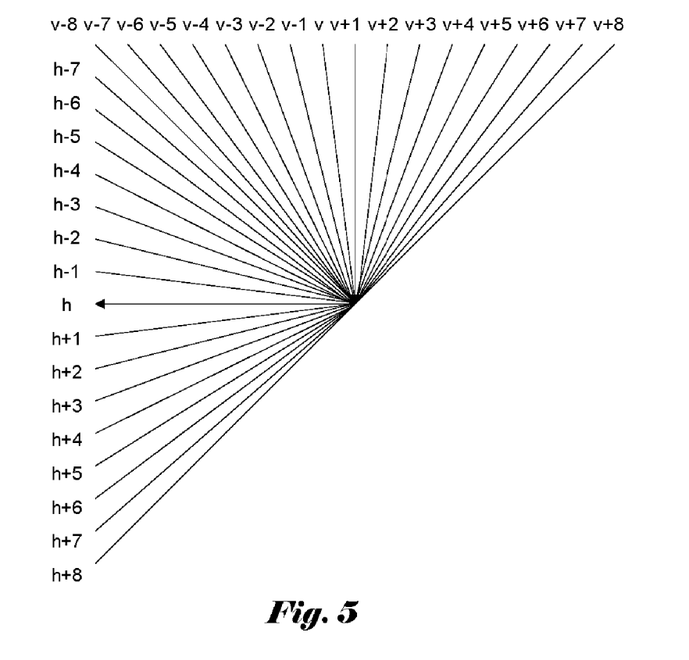
FIG. 5 illustrates the 33 directional Intra prediction mode as used by the HEVC (high efficiency video coding) standard.

When a PU is coded in Intra mode, the Intra prediction method only exploits one reference tier (or line) adjacent to the current prediction unit (PU) and one of the Intra prediction modes to generate the predictors for the current PU. The reference tier adjacent to the current prediction unit (PU) means the reference L-shape reconstructed samples, which are used for Intra prediction. For Intra prediction modes, the spatial neighbouring reconstructed pixels can be used to generate the directional prediction. There are up to 35 directions in HEVC. Out of all 35 Intra prediction modes in HEVC, 3 modes are considered as most probable modes (MPM) for predicting the Intra prediction mode in the current prediction block. Three modes selected as the MPM set. For example, the MPM set comprises the Intra prediction modes used in the left prediction block and in the above prediction block. In case that the Intra prediction modes in two neighbouring blocks are identical and both directional, or only one of the two neighbouring blocks is available and coded in Intra prediction and at the same time this Intra prediction mode is directional, two neighbouring directions immediately next to this direction is also used in MPM. DC mode and Planar mode are also considered in MPM set to fill the available spot in the MPM, especially if the above or top neighbouring blocks are not available or not coded in Intra prediction, or the Intra prediction modes in neighbouring blocks are not directional. If the Intra prediction mode for current prediction block is one of the modes in the MPM set, 1 or 2 bins is used to signal which one it is. Otherwise, it is not the same as any entry in the MPM set, it will be coded as a non-MPM mode. There are all-together 32 such non-MPM modes and a (5-bit) fixed length coding method is applied to signal this mode. The 33 directions are illustrated in FIG. 5. In FIG. 5, there are all together 33 directional modes, so H, H+1~H+8, H-1~H-7, V, V+1~V+8, V-1~V-8 are used. This system can be expanded to a general case, where horizontal and vertical modes are represented as H and V modes. For other directional modes, they can be represented either as H+k or V+k modes, where k=±1, ±2, etc. For example, if 65 directional modes are used, k can range from ±1 to ±16.

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \overset{\Delta}{\Longrightarrow} \begin{cases} vx = (1-a)x - by - e \\ vy = (1-a)y + bx - f \end{cases} \quad (1)$$

Figure 6:
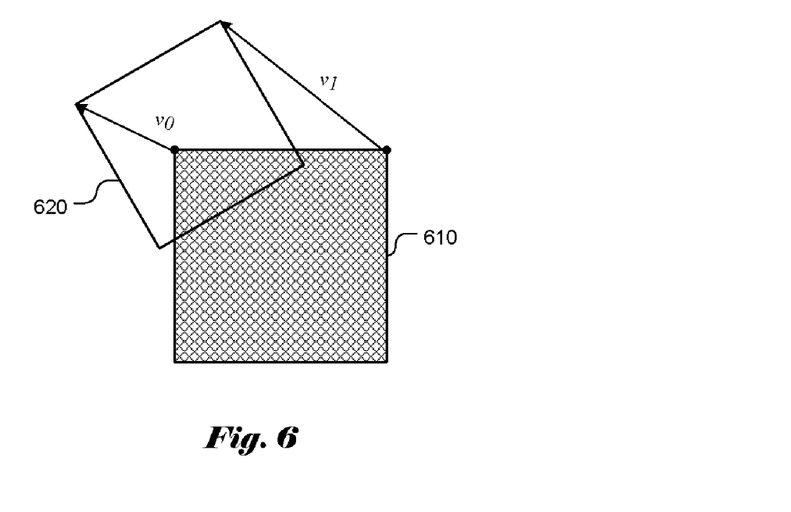
FIG. 6 illustrates an example of four-parameter affine model, where the motion model can be derived based on motion vectors at two control points.

An example of the four-parameter affine model is shown in FIG. 6, where block 610 corresponds to the current block and block 620 corresponds to the reference block. The transformed block is a rectangular block. The motion vector field of each point in this moving block can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

In the above equations, $(v_{0x}, v_{0y})$ is the control-point motion vector (i.e., $v_0$) at the upper-left corner of the block, and $(v_{1x}, v_{1y})$ is another control-point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used.

Figure 7:
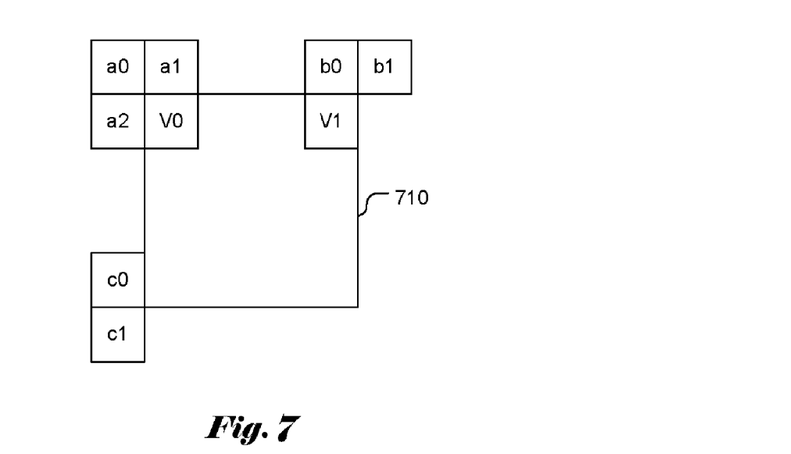
FIG. 7 illustrates the neighbouring block set used for deriving the corner-derived affine candidates.

In contribution ITU-T13-SG16-C1016, for an Inter mode coded CU, an affine flag is signalled to indicate whether the affine Inter mode is applied or not when the CU size is equal to or larger than 16×16. If the current block (e.g., current CU) is coded in affine Inter mode, a candidate MVP pair list is built using the neighbour valid reconstructed blocks. FIG. 7 illustrates the neighbouring block set used for deriving the corner-derived affine candidate. As shown in FIG. 7, $\overline{v}_0$ corresponds to a motion vector of the block V0 at the upper-left corner of the current block 710, which is selected from the motion vectors of the neighbouring block a0 (referred as the above-left block), a1 (referred as the inner above-left block) and a2 (referred as the lower above-left block). The $\overline{v}_1$ corresponds to motion vector of the block V1 at the upper-right corner of the current block 710, which is selected from the motion vectors of the neighbouring block b0 (referred as the above block) and b1 (referred as the above-right block).

In the above equation, MVa is the motion vector associated with the blocks a0, a1 or a2, MVb is selected from the motion vectors of the blocks b0 and b0 and MVc is selected from the motion vectors of the blocks c0 and c1. The MVa and MVb that have the smallest DV are selected to form the MVP pair. Accordingly, while only two MV sets (i.e., MVa and MVb) are to be searched for the smallest DV, the third DV set (i.e., MVc) is also involved in the selection process. The third DV set corresponds to motion vector of the block at the lower-left corner of the current block 710, which is selected from the motion vectors of the neighbouring block c0 (referred as the left block) and c1 (referred as the left-bottom block). In the example of FIG. 7, the neighbouring blocks (a0, a1, a2, b0, b1, b2, c0 and c1) used to construct the control point MVs for affine motion model are referred as a neighbouring block set in this disclosure.

In ITU-T13-SG16-C-1016, an affine Merge mode is also proposed. If the current block is a Merge PU, the neighbouring five blocks (c0, b0, b1, c1, and a0 blocks in FIG. 7) are checked to determine whether one of them is affine Inter mode or affine Merge mode. If yes, an affine_flag is signalled to indicate whether the current PU is affine mode. When the current PU is coded in affine Merge mode, it gets the first block coded with affine mode from the valid neighbour reconstructed blocks. The selection order for the candidate block is from left, above, above-right, left-bottom to above-left (i.e., c0→b0→b1→c1→a0) as shown in FIG. 7. The affine parameter of the first affine coded block is used to derive the $v_0$ and $v_1$ for the current PU.

In HEVC, the decoded MVs of each PU are down-sampled with a 16:1 ratio and stored in the temporal MV buffer for the MVP derivation of following frames. For a 16×16 block, only the top-left 4×4 MV is stored in the temporal MV buffer and the stored MV represents the MV of the whole 16×16 block.

Figure 8A:
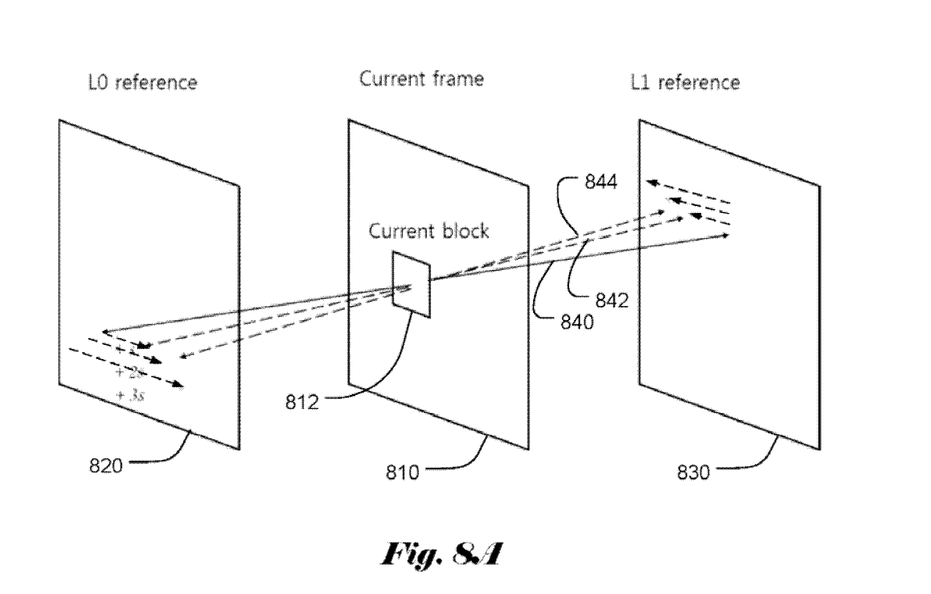
FIG. 8A illustrates an example of UMVE search process for a current block in the current frame.
Figure 8B:
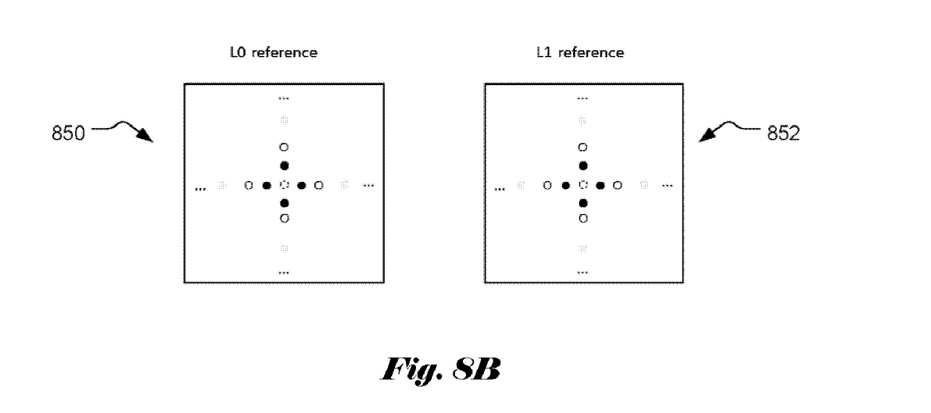
FIG. 8B illustrates an example of UMVE search at specific locations around the centre point vertically and horizontally for L0 reference and L1 reference.

In JVET-K0115 (S. Jeong, et al., "*CE4 Ultimate motion vector expression in J0024 (Test 4.2.9)*", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0115), ultimate motion vector expression (UMVE) proposed in JVET-J0024 (S. Akula, et. Al., "*Description of SDR, HDR and 360° video coding technology proposal considering mobile application scenario by Samsung, Huawei, GoPro, and HiSilicon*", in Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0024) is presented. FIG. 8A illustrates an example of UMVE search process for a current block 812 in the current frame 810. Frame 820 in reference list L0 and frame 830 in reference list L1 correspond to the two references for bi-prediction. Line 840 corresponds to a line through the centre of the current block 812 and two corresponding pixels in frames 820 and 830. The search is performed around the centre points associated with line 840 (e.g. lines 842 and 844). In order to simplify the search process, only specific locations around the centre point vertically and horizontally will be searched as shown in FIG. 8B for L0 reference (850) and L1 reference (852). UMVE is used for either Skip or Merge modes with a proposed motion vector expression method. UMVE re-uses the same Merge candidate as VVC (versatile video coding) standard being developed. Among the Merge candidates, a candidate can be selected, and is further expanded by the proposed motion vector expression method. UMVE provides a new motion vector expression with simplified signalling. The expression method includes prediction direction information, starting point, motion magnitude, and motion direction.

This proposed technique uses a Merge candidate list as is. However, only candidates that are default Merge type (MRG_TYPE_DEFAULT_N) are considered for UMVE's expansion. Prediction direction information indicates a prediction direction among L0, L1, and L0 and L1 predictions. In B slice, the proposed method can generate bi-prediction candidates from Merge candidates with uni-prediction by using mirroring technique. For example, if a Merge candidate is uni-prediction with L1, a reference index of L0 is decided by searching a reference picture in list 0, which is mirrored with the reference picture for list 1. If there is no corresponding picture, the nearest reference picture to the current picture is used. The MV of L0 is derived by scaling MV of L1. The scaling factor is calculated by POC (picture order count) distance.

If the prediction direction of the UMVE candidate is the same as one of the original Merge candidate, the index with value 0 is signalled as an UMVE prediction direction. However, if the prediction direction of the UMVE candidate is not the same as one of the original Merge candidate, the index with value 1 is signalled. After signalling the first bit, remaining prediction direction is signalled based on the pre-defined priority order of UMVE prediction direction. Priority order is L0/L1 prediction, L0 prediction and L1 prediction. If the prediction direction of Merge candidate is L1, Code '0' is signalled for UMVE' prediction direction L1. Code '10' is signalled for UMVE' prediction direction L0 and L1. Code '11' is signalled for UMVE' prediction direction L0. If L0 and L1 prediction lists are the same, UMVE's prediction direction information is not signalled.

Base candidate index defines the starting point. Base candidate index indicates the best candidate among candidates in the list as shown in Table 1.

TABLE 1

| Base candidate IDX | 0 | 1 | 2 | 3 |

The distance indices for various distances are shown in Table 2.

TABLE 2

| Distance IDX | 0 | 1 | 2 | 3 | 4 | 5 | 6 | 7 |
| --- | --- | --- | --- | --- | --- | --- | --- | --- |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown in Table 3.

TABLE 3

| Direction IDX | 00 | 01 | 10 | 11 |
| --- | --- | --- | --- | --- |
| x-axis | + | − | N/A | N/A |
| y-axis | N/A | N/A | + | − |

In this invention, an improved MH mode is disclosed to improve the performance and/or reduce system resource requirements, such as memory access bandwidth and/or computational complexity.

SUMMARY

A method and apparatus of prediction for video coding are disclosed. According to this method, input data related to a current block in a current picture is received at a video encoder side or a video bitstream corresponding to compressed data including the current block in the current picture is received at a video decoder side. The current block is partitioned into a first partition and a second partition. A first candidate is determined for the first partition and a second candidate is determined for the second partition. According to embodiments of the present invention, at least one of the first candidate and the second candidate is derived using a candidate list derived for a normal Merge mode. An MH prediction is generated by blending a first prediction corresponding to a first candidate and a second prediction corresponding to a second candidate, and the MH prediction is applied to a part of the current block. The current block or current motion information associated with the current block is encoded using at least one of the first candidate and the second candidate at the video encoder side, or decoding the current block or the current motion information associated with the current block at the video decoder side using at least one of the first candidate and the second candidate.

In one embodiment, the current block is partitioned into two triangles along a diagonal line from a lower-left corner to an upper-right corner of the current block or from an upper-left corner to a lower-right corner of the current block. In another embodiment, the current block is partitioned into two sub-blocks in a horizontal direction, a vertical direction, or an angular direction with an exact degree or with an exact slope. For example, the exact degree corresponds to 45 degrees or 135 degrees.

In one embodiment, the first candidate is derived from a first candidate list associated with the candidate list derived for the normal Merge mode. In another embodiment, the second candidate is derived from a second candidate list associated with the candidate list derived for the normal Merge mode. In yet another embodiment, the first candidate list and the second candidate list share a same candidate list. In yet another embodiment, the first candidate and the second candidate are derived from the same candidate list.

In one embodiment, the first candidate and/or the second candidate or both are selected based on an index of the first candidate, an index of the second candidate or both. For example, List0 or List1 motion information of the first candidate or the second candidate is selected based on the index of the first candidate, the index of the second candidate or both. In another example, when motion information selected for the first candidate and the second candidate is the same, the motion information for the first candidate or second candidate is not modified for blending the first prediction and the second prediction.

Another aspect of the present invention addresses signalling for the candidates. In one embodiment, one candidate index is signalled for each of the first partition and the second partition. In another embodiment, one candidate index is derived for each of the first partition and the second partition. In yet another embodiment, candidate members in front of the candidate list are assigned shorter-length codewords. The ordering of candidate members in the candidate list can be based on a fixed order similar to or the same as that for the normal Merge mode.

DETAILED DESCRIPTION OF PREFERRED IMPLEMENTATIONS

The following description is of the best-contemplated mode of carrying out the invention. This description is made for the purpose of illustrating the general principles of the invention and should not be taken in a limiting sense. The scope of the invention is best determined by reference to the appended claims.

In this invention, a Multi-hypothesis (MH) mode is disclosed to improve Inter prediction such as Skip, Merge, AMVP mode, affine Merge mode, affine AMVP mode, sub-block Merge mode, Intra mode or any combination thereof. Currently, two kinds of Merge candidate lists are generated. One Merge candidate list, including spatial merging candidates (spatial MVPs from spatial neighbouring CUs), temporal merging candidates (temporal MVP from one of collocated CUs), pairwise average merging candidates, zero motion vector merging candidates, history-based merging candidates or more merging candidates, is for regular Merge modes (or also called as-normal Merge modes) (e.g. regular_merge_flag=true) and the other Merge candidate list is for the Merge modes containing different motion information for sub-blocks (e.g. merge_subblock_flag=true). Different from the regular Merge modes, which means the current block (CU, CB, PU, or PB) uses the same motion information and the prediction for the current block is generated through motion compensation by the motion information without combined with Intra prediction, the idea for MH mode is to combine an existing hypothesis of prediction with an additional Inter-indexed prediction, which can be the hypothesis of prediction generated from a Merge motion candidate or Inter motion candidate.

Variations of Multi-hypothesis mode are proposed according to different settings, such as Intra mode setting, Intra prediction setting, motion information setting, block partition setting, combination weight setting, or any combination of above. In one embodiment, the settings can be used for the original hypothesis, the additional hypothesis, or more than one hypothesis. In another embodiment, the selection of the settings can be implicitly derived according to the block width and/or block height or be explicitly indicated by a flag signalled at CU level, CTU level, slice level, tile level, SPS level, or PPS level or be any combination of above.

In one embodiment, Intra mode setting is used when CTU constraints are enabled. If the neighbouring PUs in the same frame are coded using multi-hypothesis mode, the Intra mode can be referenced only when the PUs belong to the same CTU as the current PU, or the referenced Intra mode is inferred to be a predefined Intra mode, which can be selected from {planar, DC, vertical, horizontal, diagonal, mode 2}. This will prevent the CTU line buffer from storing the Intra mode.

Intra prediction setting is to change the process of Intra prediction for MH mode for Intra from the process of Intra prediction for normal Intra mode. In one embodiment, the Intra prediction for MH mode for Intra can be a simplified version of the Intra prediction for the normal Intra mode. The simplification mechanism can be to omit the filtering process of the reference pixels, to reduce the length of Intra interpolation filter, to skip the blending of current Intra prediction and neighbouring Intra reconstruction such as position dependent Intra prediction combination (PDPC), which invokes combination of the un-filtered or filtered boundary reference samples and HEVC style Intra prediction with un-filtered or filtered boundary reference samples, or any combination of the above. For example, when MH mode for Intra is selected, PDPC needs to be disabled and no filtering process can be applied. Then, for the horizontal/vertical prediction mode or DC mode, the buffer for the prediction of current block can be reduced to one line or one value, respectively.

Motion information setting is for the consideration of memory access bandwidth and computational complexity. In one embodiment, the motion information setting can be a scaling scheme to scale the reference picture (e.g. R2) for one hypothesis of prediction with a predefined list (e.g. List B, B=0 or 1) according to the reference picture (e.g. R1) for another hypothesis of prediction with a predefined list (e.g. List A, A=0 or 1). Some variances of the scaling scheme are proposed. For example, the scaling scheme corresponds to scaling R2 to be the same as R1. In another example, the scaling scheme corresponds to scaling R2 to be close to R1. In another embodiment, the motion setting can be applied to four different cases. The first case corresponds to that the first hypothesis of prediction is uni-prediction of List B and the additional hypothesis of prediction is uni-prediction of List A. One possible way is that no motion information setting is required since the worst case of memory access bandwidth is the same as that of the hypothesis of prediction with bi-prediction.

Another possible mechanism is that the motion information setting like the scaling scheme is applied. The second case is that the first hypothesis of prediction is uni-prediction of List A and the additional hypothesis of prediction is bi-prediction. One possible way is that the reference picture of List X, where X=A, for the additional hypothesis of prediction, is performed with motion information setting.

Another possible way is that the reference picture of List X for the additional hypothesis of prediction is performed with motion information setting, where X can be 0 or 1 depending on that which one makes the reference picture of List X closer to the reference picture of List A. The third case is that the first hypothesis of prediction is bi-prediction and the additional hypothesis of prediction is uni-prediction of List B. One possible way is that the reference picture of List B is performed with the motion setting like scaling scheme. The reference picture of List B for the additional hypothesis can be scaled to the reference picture of List X, where X=B, for the first hypothesis of prediction. Another possible way is that the reference picture of List B for the additional hypothesis can be scaled to the reference picture of List X, where X can be 0 or 1 depending on that which one makes the reference picture of List X closer to the reference picture of List B, for the first hypothesis of prediction. The fourth case is that both of the first and additional hypotheses of prediction are bi-prediction. One possible way is that the reference picture of List 0/1 for the additional hypothesis of prediction is scaled to the reference picture of List 0/1 for the first hypothesis of prediction, respectively. Another possible way is that the reference picture of List 0 or List 1 for the additional hypothesis of prediction is scaled to the closer reference picture of List 0 or List 1 for the first hypothesis of prediction. Another possible way is that the reference picture of List 0 or List 1 for the additional hypothesis is scaled to the reference picture of one predefined List for the first hypothesis of prediction.

Figure 9:
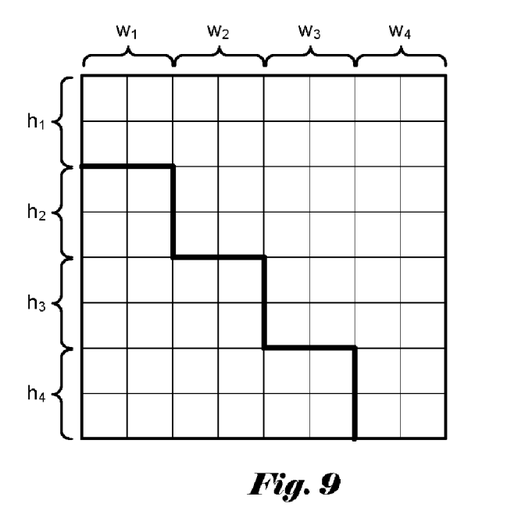
FIG. 9 illustrates an example of jagged subblocks for partitioning an 8×8 block.

Block partition setting is to apply MH to the part of block instead of the whole block according to a predefined partition rule. The first hypothesis of prediction is performed on one sub-block and another hypothesis of prediction is performed on another sub-block. The blending mechanism for multi-hypothesis of prediction can be applied to the connected area. In one embodiment, the block partition can follow the directions such as horizontal, vertical, diagonal, or 135-degree diagonal direction. The horizontal-direction/vertical-direction partition can divide the block into two sub-blocks with each sub-block height or width, denoted as $H_i$ or $W_i$, where i can be 1 or 2 and $H_i$ or $W_i$=(block height—$H_2$) or (block width—$W_2$). For example, the ratio of $H_i$ and block height or the ratio of $W_i$ and block width can be 1:N, where N is 2, 3, 4, 6, 8, 16, or 32. The diagonal/vertically-directional partition can divide the block with the direction following an angular direction based on directional information (for example, with an exact degree, such as 45 (which may be represented using tan(45 degree)=1) or 135 degree (which may be represented using tan(135 degree)=−1), or with the direction from the top-left corner to the bottom-right corner or from the top-right corner to the bottom-left corner.) In some other embodiments, the directional information may be represented using sine, cosine, tangent or any other trigonometric function or slope information or any other format to represent the direction for dividing the block. In another embodiment, the block partition can follow the polygon such as L shape or jagged shape. The L-shape partition can divide the block into a N×N square or N×M rectangle sub-block, and a remaining L-shape region, where N and M can be (n*1/(block width)) or (n*1/(block height)) and n is a positive integer. The N×N square or N×M rectangle sub-block can be located at each of the four corners. The jagged shape can divide the block into two jagged sub-blocks defined with $w_i$ and $h_j$, where i and j can be 2, 3, 4, 5, 6, 7, or 8 and $w_i$ can be different from $h_j$. An example for 8×8 block with the jagged-shape partition is shown in FIG. 9. In FIG. 9, an 8×8 block is divided into two sub-blocks defined with $w_i$ and $h_j$, where i and j are from 1 to 4 in this example and each of them is set to be 2. In another embodiment, the block partition can be decided according to the block width, block height or block size. In another embodiment, one hypothesis of prediction is applied to the one partitioned sub-block according to a predefined rule. The predefined rule can be as follow. If the hypothesis of prediction is generated by the spatial motion candidate from $B_0$, $B_1$, or $B_2$, it should be applied to the partitioned sub-block at the above side or the partitioned sub-block adjacent to the block referred to derive the spatial MVPs. Similarly, if the hypothesis of prediction is generated by the spatial motion candidate from $A_0$, or $A_1$, it should be applied to the partitioned sub-block at the left side or the partitioned sub-block adjacent to the block referred to derive the spatial MVPs. Other cases can depend on a predefined mapping table or an explicit signalled flag.

Combination weight setting deals with weightings for multiple hypotheses of prediction. For example, two hypotheses of prediction can be combined. The final prediction can be calculated by the following equation:

$$P_{ij}=WH1_{ij}*PH1_{ij}+WH2_{ij}*PH2_{ij}.$$

In the above equation, $P_{ij}$ denotes the final prediction at the position (i,j) within the current block, $PH1_{ij}$ and $PH2_{ij}$ denote the first and additional hypothesis of prediction at the position (i,j) within the current block respectively. $WH1_{ij}$ and $WH2_{ij}$ denotes the weightings for the first and additional hypothesis of prediction at the position (i,j) within the current block respectively, where i is from 0 to (block width—1), and j is from 0 to the block (height—1). In one embodiment, for the region with $WH1_{ij}$ or $WH2_{ij}$ equal to 0, the additional or first hypothesis of prediction can be assigned to be the final prediction and the outcome is the same as what block partition setting performs. In another embodiment, $WH1_{ij}$ and $WH2_{ij}$ can be pixel-based and assigned with a predefined table. In another embodiment, $WH1_{ij}$ and $WH2_{ij}$ can be subblock-based. Each pixel within N×M sub-block, shares the same weighting, where N and M can be 2, 3, 4, 5, 6, 7, or 8. The values of N and M can vary with the block width, block height or pixel position. For example, when the pixel is located at the boundary of the current block, N or M can be larger.

Figure 10:
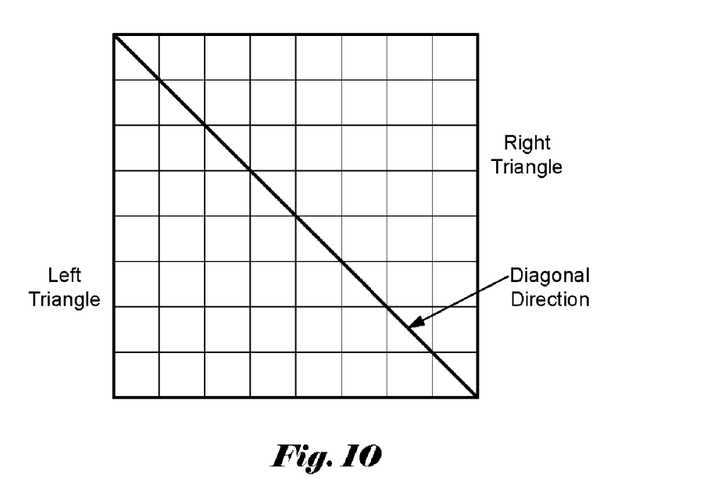
FIG. 10 illustrates an example of applying triangle partition to a block to partition the block into two triangle regions.
Figure 11A:
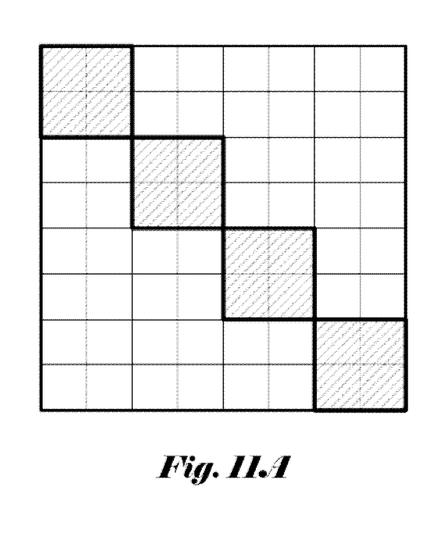
FIG. 11A to FIG. 11D illustrate various examples of applying different weights to the marked areas.
Figure 11B:
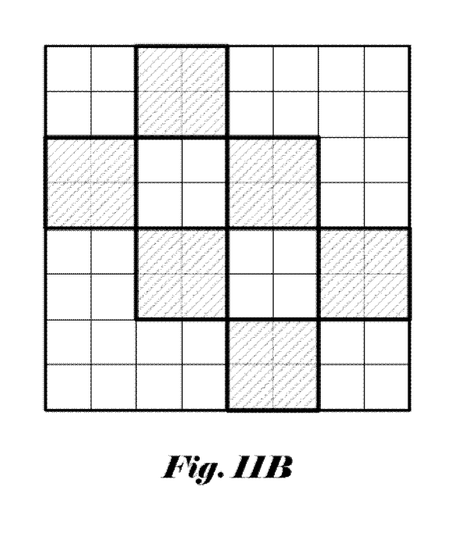
Figure 11C:
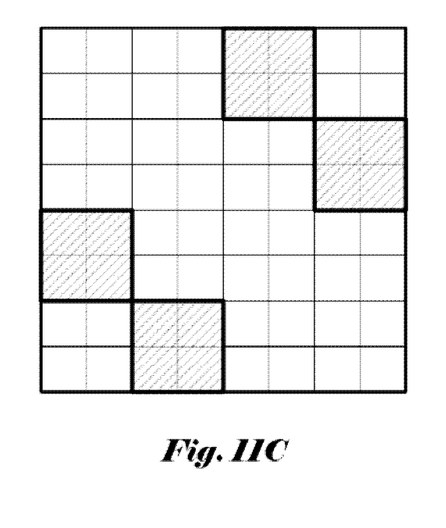
Figure 11D:
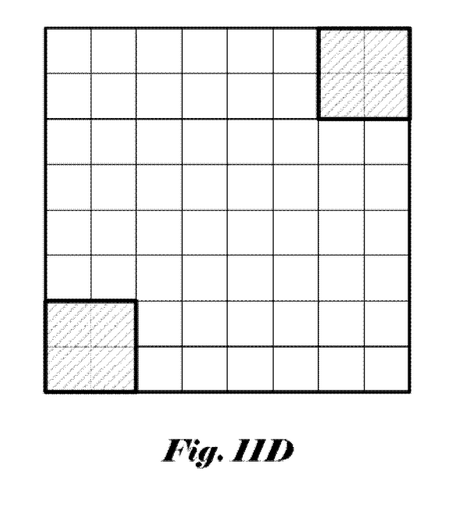

Combining block partition setting and combination weight setting is to apply weightings according to the partition. In one embodiment, equal weightings are applied to the pixels along the partition direction. In another embodiment, one of the hypothesis of prediction is performed on the pre-defined region (denoted as R) and uses the higher weightings when blending with another hypothesis of prediction within a sub-region of R. As the pixel within R gets far away from the partition direction, the weighting for the hypothesis of prediction, which performs on R, gets larger. In the following, an example is shown for the 8×8 block being partitioned with a diagonal direction and weightings are applied to subblocks. It splits a CU into two triangular prediction units in diagonal direction, shown in FIG. 10. If the first and additional hypothesis of prediction are performed on the left and right triangle region (denoted as $R_L$ and $R_R$) with weightings (denoted as $WH1_{ij}$ and $WH2_{ij}$) respectively, the different weightings can be applied to different areas, shown in FIG. 11A to FIG. 11D. Note that 3-bit right-shifting is applied when averaging the weighting hypotheses of prediction in this example. In FIG. 11A, equal weightings, such as $WH1_{ij}=4$ and $WH2_{ij}=4$, are applied to the marked areas (as shown by areas filled with slant lines); in FIG. 11B, $WH1_{ij}=5$ and $WH2_{ij}=3$ are applied to the marked areas in $R_L$ and $WH1_{ij}=3$ and $WH2_{ij}=5$ are applied to the marked areas in $R_R$; in FIG. 11C, $WH1_{ij}=6$ and $WH2_{ij}=2$ are applied to the marked areas in $R_L$ and $WH1_{ij}=2$ and $WH2_{ij}=6$ are applied to the marked areas in $R_R$; in FIG. 11D, $WH1_{ij}=7$ and $WH2_{ij}=1$ are applied to the marked areas in $R_L$ and $WH1_{ij}=1$ and $WH2_{ij}=7$ are applied to the marked areas in $R_R$.

Some approaches of constructing the candidate list and selecting the Merge candidates are disclosed for MH prediction with diagonal or vertical diagonal direction, which is referred as triangular prediction unit mode. First, the scenario of triangular prediction unit mode is described as follows. The key idea is to introduce a new triangular partition for motion compensated prediction. The triangular partition splits a CU into two triangular prediction units, in either diagonal or inverse diagonal direction. Each triangular prediction unit in the CU is Inter-predicted using its own uni-prediction motion vector and reference frame. An adaptive weighting process is performed to the diagonal edge after predicting the triangular prediction units. Then, the transform and quantization process are applied to the whole CU. It is noted that this mode is only applied to Skip and Merge modes. The proposed approaches consist of constructing the candidate list for each of triangular prediction unit, constructing a shared candidate list for the two triangular prediction units, generating a new uni-prediction candidate, ordering the motion candidates in the candidate list, pruning the candidates in the candidate list, saving the motion information for the diagonal edge, or any combination of above.

Constructing the candidate list for each of prediction unit is to build a candidate list, denoted as CandList1, for the first triangular prediction unit and then build another candidate list, denoted as CandList2, for the second triangular prediction unit accordingly. In one embodiment, first, CandList1 can be formed with the normal/extended candidates for Merge mode. For example, the candidate position can be from any subset of the MVP candidate set for AVMP/Merge in HEVC (as shown in FIG. 1) or the extended candidates such as deriving new Merge candidates by average two existing motion candidates with or without the same reference pictures, deriving additional spatial candidates from two non-adjacent neighbouring positions with one from the closest non-neighbouring block in straight horizontal spatial distance and the other one from the closest non-neighbouring block in straight vertical spatial distance, or deriving additional spatial Merge candidates from positions in an outer reference area. In one embodiment, the candidate list for CandList1 can reuse the candidate list of regular Merge mode (or also called normal Merge mode). Then, the bi-prediction candidates are removed from CandList1 or the motion candidates with one predefined list are chosen from each of bi-prediction candidates. In another embodiment, CandList2 can be formed as CandList1. In another embodiment, CandList2 can be first formed as CandList1. The candidate used for the first triangular prediction unit is then removed from CandList2 to avoid the redundancy case. Finally, a predefined rule for filling up CandList2 can be applied. The predefined rules for filling up CandList2 can be chosen from any of the methods disclosed herein for generating a new uni-prediction candidate.

The method of using a shared candidate list for the two prediction units (for example, two triangular prediction units or two prediction units with any other shape) may comprise building a uni-prediction candidate list in a similar way as CandList1, and/or choosing two candidates (denoted as cand1 and cand2 respectively) for the first and second triangular prediction units according to a predefined rule (e.g. a mapping table).

The method of generating a new uni-prediction candidate may comprise modifying the existing uni-prediction candidate with a predefined rule. In one embodiment, a new uni-prediction candidate can be generated by adding an offset, n to motion vectors of the original uni-prediction candidate. The offset n can be fixed at 1, 2, 3, 4, 5, 6, 7, 8, etc. or vary with the block width, height or motion vector precision. In another embodiment, a new uni-prediction candidate can be generated by mirroring the original uni-prediction candidate. For example, the mirroring may correspond to the inverse direction of horizontal motion vector and change List0/1 to List1/0. In another embodiment, a new uni-prediction candidate can be generated by averaging the two candidates with a predefined list. The weightings for averaging the two candidates with the predefined list can be equal or vary with the block width, block height or pixel position. For example, when the pixel position is closer to the block containing the first motion candidate, the weighting for the first motion candidate is larger than the weighting for the second motion candidate.

The method of ordering the motion candidates (also called candidate members in this disclosure) in the candidate list may comprise deciding the priority for the motion candidates in the candidate list. The motion candidates, put in the front of the candidate list, can be signalled with shorter-length codeword or be tested most during the encoder mode decision. In one embodiment, the candidate priority can be a fixed order similar to that for regular Merge mode (or also called as normal Merge mode). In another embodiment, the candidate priority can vary with the block width, block height, or block position. For example, when the block is located at the left boundary, the candidates from the above or right candidate set are put in front of the candidate list. For another example, when the block shape is narrow (e.g. the block width/height twice larger than the block height/width), the candidates from the candidate set for those blocks adjacent to the long block side are put in the front of the candidate list.

Pruning the candidate in the candidate list is required when cand1 and cand2 are the same or similar. For pruning, some processing can be applied to any one or both of cand1 and cand2. In one embodiment, the similarity of cand1 and cand2 can be measured with the motion vector distance for cand1 and cand2 and the reference pictures for cand1 and cand2. For example, the cand1 and cand2 are similar when the reference of cand1 and cand2 are the same and the motion vector distance is smaller than a certain threshold. Some pruning schemes are disclosed as follows for the case that cand1 and cand2 are considered to be the same or similar. One scheme is to disallow this combination for cand1 and cand2 and find the next combination for cand1 and cand2 by following the priority in the candidate list. According to another scheme, if cand1 or cand2 is the uni-prediction motion candidate chosen from the bi-prediction motion candidate with one predefined list, cand1 or cand2 can be replaced by the motion candidate chosen from the bi-prediction candidate with the other list. According to yet another scheme, cand1 or cand2 can be replaced by one new candidate generated by applying any disclosed approach of generating a new uni-prediction candidate to cand1 or cand2.

The method of saving the motion information for the diagonal edge may comprise handling the spatial case, which happens when storing the motion information within the connected area for referencing by the following coded block. It is noted that two motion candidates (i.e., cand1 and cand2) are performed on the connected area. In one embodiment, if the motion candidates for both triangular prediction units are uni-prediction with the same list, the motion information can be modified by adding an offset to the motion vectors of cand1 or cand2 and then store the modified motion information according to one embodiment. In another embodiment, cand1 or cand2 can be mirrored and a bi-prediction candidate corresponding to (cand1 and mirrored cand2) or (cand2 and mirrored cand1) can be stored.

In one embodiment, the partition 1 and partition 2 can share the same candidate list. For example, the candidate list can be the same as the candidate list for regular Merge mode (or also called normal Merge mode) or other candidate list of other coding tools. In an example, two candidates can be derived for two partitions. At least one of the two candidates can be derived using a candidate list derived for a regular Merge mode (or also called normal Merge mode). An MH prediction can be generated by blending the prediction generated from the two candidates. In one embodiment, the two candidates can be derived from the same candidate list. For each partition, one candidate index is signalled or derived. With the candidate indices, two partitions can have their own motion information. If the selected candidate is uni-prediction candidate, the uni-prediction motion information is used. If the selected candidate is bi-prediction candidate, one or more processing rule can be used to select the uni-prediction motion information. For example, the List-0 motion information can be selected if the selected candidate is bi-prediction candidate. In one embodiment, the processing rule can be different for two partitions. For example, the List-0/List-1 motion information can be selected if the selected candidate is bi-prediction candidate for the first partition, the List-1/List-0 motion information can be used if the selected candidate is bi-prediction candidate for the second partition. In another embodiment, the processing rule can use the information of the two partitions or the indices of two partitions. For example, if two partitions select the same candidate and the candidate is a bi-prediction candidate, the first partition selects the List-0/List-1 motion information and the second partition selects the List-1/List-0 motion information. In another example, if two partitions select the same candidate and the candidate is a bi-prediction candidate, the first partition selects the List-0/List-1 motion information and the second partition selects the List-1/List-0 motion information; otherwise, the List-0 or List-1 motion information is selected if the selected candidate is bi-prediction candidate. After the motion information selection, if the motion information of two partitions are the same (e.g. same MVs and same reference list and same reference picture index, or same MVs and same reference picture), the motion information is not modified for deriving new candidate according to one embodiment. It can be treated as the uniform uni-prediction CU. In another embodiment, if the motion information of two partitions are the same, one of the motion information can be modified. For example, the motion information of the second partition can be modified by a process, such as adding some predefined or derived MV/MV-offset on the motion information, or mirroring/scaling the motion information to another reference list and/or another reference picture. In another embodiment, the candidate index of the second partition can be modified to derive another motion information, such as selecting the first candidate or selecting the adjacent candidate of the selected candidate (candidate index −1 or +1).

Any combination of above can be applied to any Multi-hypothesis mode such as MH mode for Merge, MH mode for Inter or MH mode for Intra.

Any of the foregoing methods disclosed above can be implemented in encoders and/or decoders. For example, any of the methods disclosed above can be implemented in an Inter/Intra coding module of an encoder, a motion compensation module, a Merge/Inter/Intra candidate derivation module of a decoder. Alternatively, any of the methods disclosed above can be implemented as a circuit coupled to the Inter/Intra coding module of an encoder and/or motion compensation module, a Merge/Inter/Intra candidate derivation module of the decoder.

Figure 12:
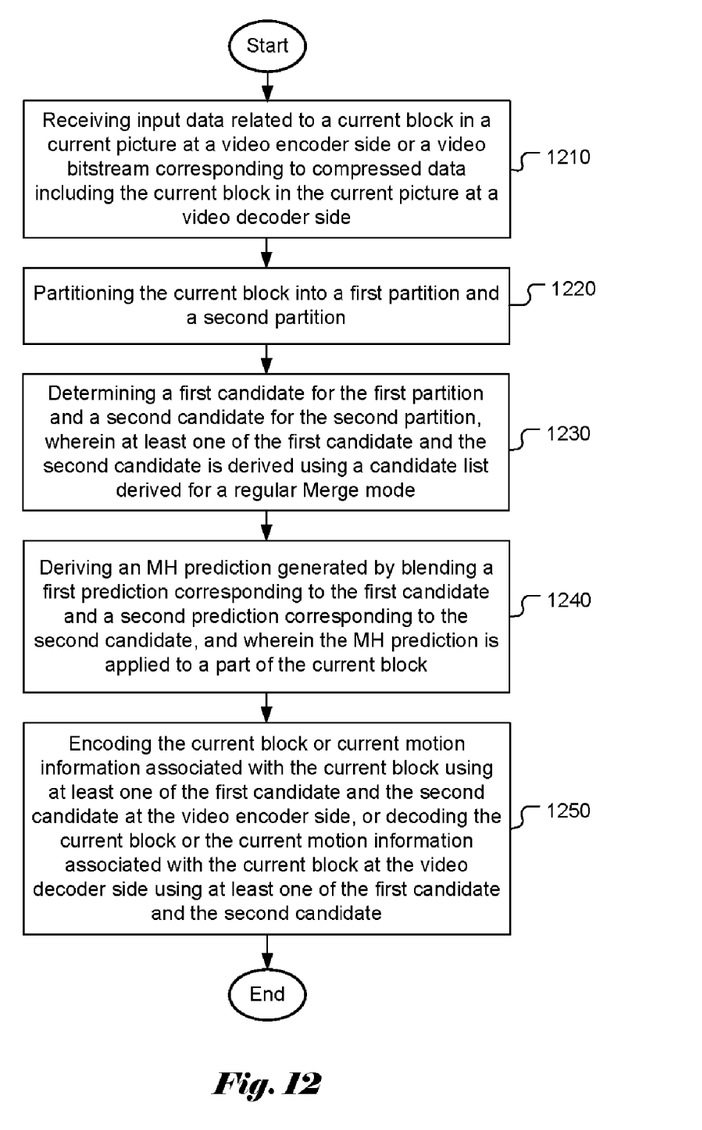
FIG. 12 illustrates a flowchart of an exemplary prediction for video coding using a Multi-hypothesis (MH) mode according to an embodiment of the present invention.

FIG. 12 illustrates a flowchart of an exemplary prediction for video coding using a Multi-hypothesis (MH) mode according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, input data related to a current block in a current picture is received at a video encoder side or a video bitstream corresponding to compressed data including the current block in the current picture is received at a video decoder side in step 1210. The current block is partitioned into a first partition and a second partition in step 1220. A first candidate is determined for the first partition and a second candidate is determined for the second partition in step 1230, wherein at least one of the first candidate and the second candidate is derived using a candidate list derived for a regular Merge mode (or also called normal Merge mode). An MH prediction is generated by blending a first prediction corresponding to the first candidate and a second prediction corresponding to the second candidate in step 1240, and wherein the MH prediction is applied to a part of the current block. The current block or current motion information associated with the current block is encoded using at least one of the first candidate and the second candidate at the video encoder side, or the current block or the current motion information associated with the current block at the video decoder side is decoded using at least one of the first candidate and the second candidate in step 1250.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of prediction for video coding, the method comprising:
   receiving input data related to a current block in a current picture at a video encoder side or a video bitstream corresponding to compressed data including the current block in the current picture at a video decoder side;
   partitioning the current block into a first partition and a second partition;
   determining a first candidate for the first partition and a second candidate for the second partition, wherein at least one of the first candidate and the second candidate is derived using a candidate list derived for a normal Merge mode;
   generating an MH prediction by blending a first prediction corresponding to the first candidate and a second prediction corresponding to the second candidate, and wherein the MH prediction is applied to a part of the current block; and
   encoding the current block or current motion information associated with the current block using at least one of the first candidate and the second candidate at the video encoder side, or decoding the current block or the current motion information associated with the current block at the video decoder side using at least one of the first candidate and the second candidate.

2. The method of claim 1, wherein the current block is partitioned into two triangles along a diagonal line from a lower-left corner to an upper-right corner of the current block or from an upper-left corner to a lower-right corner of the current block.

3. The method of claim 1, wherein the current block is partitioned into two sub-blocks in a horizontal direction, a vertical direction, or an angular direction based on directional information.

4. The method of claim 3, wherein the directional information corresponds to 45 degrees or 135 degrees.

5. The method of claim 1, wherein the first candidate is derived from a first candidate list associated with the candidate list derived for the normal Merge mode.

6. The method of claim 5, wherein the second candidate is derived from a second candidate list associated with the candidate list derived for the normal Merge mode.

7. The method of claim 6, wherein the first candidate list and the second candidate list share a same candidate list.

8. The method of claim 1, wherein the first candidate and the second candidate are derived from the same candidate list.

9. The method of claim 1, wherein the first candidate, the second candidate or both are selected based on an index of the first candidate, an index of the second candidate or both.

10. The method of claim 9, wherein List 0 or List 1 motion information of the first candidate or the second candidate is selected based on the index of the first candidate or the index of the second candidate.

11. The method of claim 9, wherein when motion information selected for the first candidate and the second candidate is the same, the motion information for the first candidate or the second candidate is not modified.

12. The method of claim 1, wherein one candidate index is derived for each of the first partition and the second partition.

13. The method of claim 1, wherein candidate members in front of the candidate list are assigned shorter-length codewords.

14. The method of claim 1, wherein one candidate index is signalled for each of the first partition and the second partition.

15. The method of claim 14, wherein signalling of at least one of the candidate index for partition 1 and the candidate index for partition 2 is the same as signalling of Merge index for the normal Merge mode.

16. The method of claim 14, wherein ordering of candidate members in the candidate list is based on a fixed order similar to or the same as that for the normal Merge mode.

17. An apparatus of video coding, the apparatus comprising one or more electronic circuits or processors arranged to:
receive input data related to a current block in a current picture at a video encoder side or a video bitstream corresponding to compressed data including the current block in the current picture at a video decoder side;
partition the current block into a first partition and a second partition;
determine a first candidate for the first partition and a second candidate for the second partition, wherein at least one of the first candidate and the second candidate is derived using a candidate list derived for a normal Merge mode;
generate an MH prediction by blending a first prediction corresponding to the first candidate and a second prediction corresponding to the second candidate, and wherein the MH prediction is applied to a part of the current block; and
encode the current block or current motion information associated with the current block using at least one of the first candidate and the second candidate at the video encoder side, or decode the current block or the current motion information associated with the current block at the video decoder side using at least one of the first candidate and the second candidate.

* * * * *